H. W. IRWIN AND W. K. HAWK.
THEFT DETECTING MEANS FOR VEHICLES.
APPLICATION FILED APR. 22, 1919.
1,336,745. Patented Apr. 13, 1920.
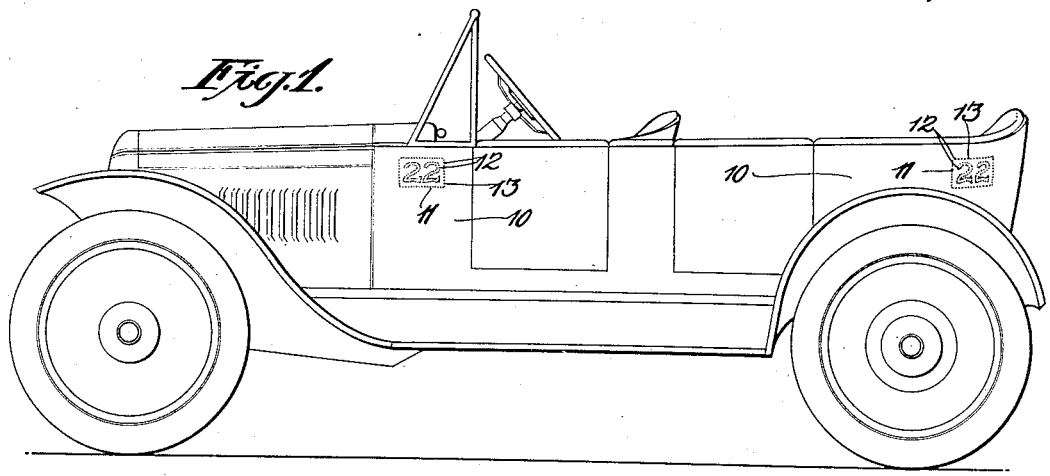
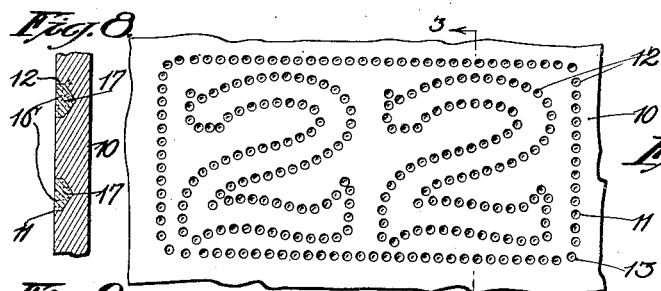 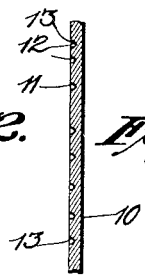
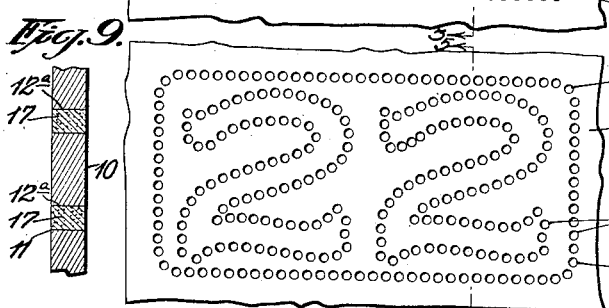 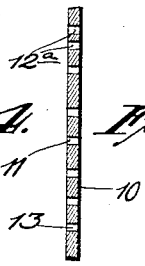
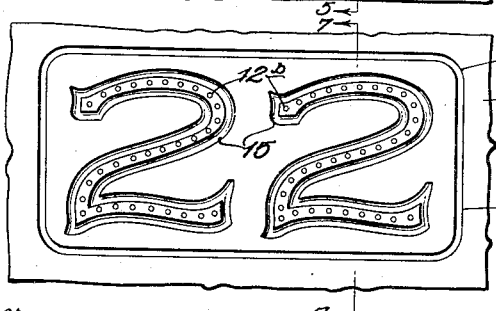 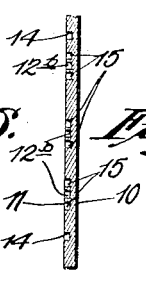
Witnesses
Inventors
Howard W. Irwin.
Wayne K. Hawk.
Their Attorney

UNITED STATES PATENT OFFICE.

HOWARD W. IRWIN AND WAYNE K. HAWK, OF PHILADELPHIA, PENNSYLVANIA.

THEFT-DETECTING MEANS FOR VEHICLES.

1,336,745.     Specification of Letters Patent.     Patented Apr. 13, 1920.

Application filed April 22, 1919. Serial No. 291,993.

*To all whom it may concern:*

Be it known that we, HOWARD W. IRWIN and WAYNE K. HAWK, citizens of the United States, both residing at Philadelphia, county of Philadelphia, and State of Pennsylvania, have invented certain new and useful Improvements in Theft-Detecting Means for Vehicles, of which the following is a specification.

The chief object of our invention is to detect the theft of a vehicle by marking the vehicle in such manner that the marking can not be changed or removed without said change or removal being noticeable to the eye of any person looking at the vehicle.

Another object of our invention is to so make the identification marking that the same will be neat and attractive in appearance so that it can be placed even upon the highest grade of cars without rendering the same unsightly.

These objects, and other advantageous ends which will be described hereinafter, we attain in the following manner, reference being had to the accompanying drawings in which—

Figure 1 is a side elevation of an automobile having our identification marking as a part thereof, Fig. 2 is an enlarged fragmentary elevation of a part of the automobile shown in Fig. 1, including one of our identification markings, Fig. 3 is a fragmentary section taken on the line 3—3 of Fig. 2, Fig. 4 is a view of similar nature to Fig. 2 and showing a slightly different form of the identification markings, Fig. 5 is a fragmentary section taken on the line 5—5 of Fig. 4, Fig. 6 is a view of similar nature to Figs. 2 and 4 and showing still another form of our identification markings, Fig. 7 is a fragmentary section taken on the line 7—7 of Fig. 6, Fig. 8 is an enlarged fragmentary section of the form of our invention shown in Figs. 1, 2 and 3 and showing certain of the cavities or indentations filled with material, such for example as colored paint or the like, and Fig. 9 is a view of similar nature to that shown in Fig. 8 and including a filling material, such for example as colored paint and illustrating the same in connection with the form of our invention illustrated in Figs. 4 and 5.

Referring to Figs. 1 to 3 inclusive of the drawing, 10 represents the body portion of an automobile which has our identification marking 11 as a part thereof, said identification marking being produced by drilling or otherwise forming a plurality of holes 12 in the outer face of the body portion, and as illustrated the marking 11 consists of the numeral "22" inclosed in a marginal outline 13, both the numeral "22" and the outline 13 being produced by the holes 12. The holes 12, as shown in Figs. 1 to 3 inclusive do not pass entirely through the body portion 10, as is clearly shown in the section Fig. 3. In the form shown in Figs. 4 and 5, the holes 12$^a$ of the identification marking 11 pass entirely through the body portion 10. In the form of our invention shown in Figs. 6 and 7, the margin 14 is produced by a groove cut in the body portion 10 and the numeral "22" is produced by grooves 15 and holes 12$^b$. If desired, the holes 12, in the form of our invention shown in Figs. 1 to 3 inclusive can be filled with a filling of colored paint or the like as indicated at 16 in Fig. 8. In the same manner, the form of our invention shown in Figs. 4 and 5 can have the holes 12$^a$ filled with a filling 17 of colored paint or the like.

By including an identification marking as a part of the body portion of a vehicle in the manner above noted it would be practically impossible to remove or alter the same without the removal or alterations being noticeable especially if the body portion had a high gloss finish produced by the painting and varnishing of the body portion in the skilful and well known modern day method. For example, if a person attempted to paint over the identification marking, that painting would stand out prominently in comparison to the original finish of the car. Furthermore, it would be impossible to cut out the identification marking or the part of the body portion containing the same would be noticeable. By inclosing the identification numeral or similar marking by a margin of the character shown at 13 and 14 it would be impossible to add any additional numbers or markings in order to avoid detection. Our invention is of course valuable to individual owners of vehicles but it would be especially valuable to theft-insurance companies, since the identification marking could be applied to automobiles by a theft-insurance company and a record made of the identification markings so that the latter could be used in tracing an automobile which had been stolen. For example, a man owning an automobile would receive a certain marking from the theft-insurance company and that marking would be applied in the manner of our invention, as above specified, to the body of his automobile. If the automobile were stolen, the owner could notify the theft-insurance company, giving the latter the marking on the car which had been stolen and the insurance company could immediately put their tracers and detectives out for the recovery of the automobile bearing the specified identification marking.

In the claims we have used the words "holes" and it will be understood that whenever used, the same are meant to imply holes which partially pass through the body portion of the vehicle, as shown in Figs. 1, 2, 3, 6, 7 and 8, inclusive or which entirely pass through the body portion, such for example as shown in Figs. 4 and 5. In each instance the identification marking is produced by an interruption of a surface of the body portion and it will be understood that for the purposes of our invention the marking can be made by producing a number of holes as shown in Figs. 1 to 5 or by grooving the body portion as shown in Figs. 6 and 7.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A body portion of a vehicle having an identification number produced by an interruption of a surface of said body portion, said body portion also having an interruption of said surface providing a margin closely surrounding said number whereby no other numbers can be added to said first number without detection; substantially as described.

2. A body portion of a vehicle having an identification number thereon produced by a plurality of holes formed in said body portion and spaced apart, said body portion also having an interruption of its surface providing a continuous margin closely surrounding said number whereby no other holes can be added to said first number without detection; substantially as described.

In testimony whereof we have signed our names to this specification in the presence of two subscribing witnesses.

HOWARD W. IRWIN.
WAYNE K. HAWK.

Witnesses:
EVELYN CROMPTON,
CHAS. E. POTTS.